US012609289B2

(12) United States Patent
Donders et al.

(10) Patent No.: US 12,609,289 B2
(45) Date of Patent: Apr. 21, 2026

(54) MICRO-LENS ARRAY FOR METAL-CHANNEL PHOTOMULTIPLIER TUBE

(71) Applicant: KLA Corporation, Milpitas, CA (US)

(72) Inventors: Paul Donders, Burlington (CA); Derek Mackay, Palo Alto, CA (US)

(73) Assignee: KLA Corporation, Milpitas, CA (US)

( * ) Notice: Subject to any disclaimer, the term of this patent is extended or adjusted under 35 U.S.C. 154(b) by 204 days.

(21) Appl. No.: 17/873,114

(22) Filed: Jul. 25, 2022

(65) Prior Publication Data

US 2023/0326728 A1 Oct. 12, 2023

Related U.S. Application Data

(60) Provisional application No. 63/328,300, filed on Apr. 7, 2022.

(51) Int. Cl.
*H01J 43/18* (2006.01)

(52) U.S. Cl.
CPC .................................... *H01J 43/18* (2013.01)

(58) Field of Classification Search
CPC .................................. H01J 43/18; H01J 43/12
See application file for complete search history.

(56) References Cited

U.S. PATENT DOCUMENTS 4,659,921 A * 4/1987 Alfano .................... H01J 43/04 356/318
5,572,089 A * 11/1996 Kyushima ................. H01J 9/12 313/532
9,076,639 B2 7/2015 Maleev
9,478,402 B2 10/2016 Chuang et al.
2004/0061054 A1 4/2004 Kondo et al.
2004/0069932 A1* 4/2004 Kato ........................ H01J 43/28 250/214 VT
2004/0100193 A1 5/2004 Kato et al.
2008/0061690 A1 3/2008 Ohmura et al.
2010/0294949 A1* 11/2010 Sasaki ................ G02B 21/0076 250/227.24
2015/0136948 A1 5/2015 Mackay et al.

FOREIGN PATENT DOCUMENTS

JP 05-290793 A 11/1993
JP 11-345587 A 12/1999
KR 102166395 B1 10/2020
WO 2006080104 A2 8/2006

OTHER PUBLICATIONS

WIPO, International Search Report for PCT/US2023/016781, Mar. 27, 2024.
TIPO, Office Action issued for ROC (Taiwan) Patent Application No. 111146669, Nov. 11, 2025.

* cited by examiner

*Primary Examiner* — Thanh Luu
*Assistant Examiner* — Mai Thi Ngoc Tran
(74) *Attorney, Agent, or Firm* — Hodgson Russ LLP

(57) ABSTRACT

The effective quantum efficiency of a metal-channel photomultiplier tube can be increased with an optical system. The optical system can direct incident light from areas of low efficiency on the cathode of the metal-channel photomultiplier tube instead to areas of high efficiency on the cathode. These high-efficiency areas of the cathode can correspond to a position between the dynode structure.

7 Claims, 6 Drawing Sheets

MICRO-LENS ARRAY FOR METAL-CHANNEL PHOTOMULTIPLIER TUBE

FIELD OF THE DISCLOSURE

This disclosure relates to optics for a photomultiplier tube.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it maximizes the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etching, deposition, and ion implantation. An arrangement of multiple semiconductor devices fabricated on a single semiconductor wafer may be separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

As demand for semiconductor devices increases, the need for improved device inspection capabilities also will increase. Photocathodes can be used for improved optical inspection. In a general sense, a photocathode emits photoelectrons in response to the absorption of photons impinging on the photocathode. The photocathode can be part of a photomultiplier tube (PMT). Previously, light would be uniformly incident on the cathode of a PMT hitting both low-efficiency and high-efficiency areas. Consequently, half the incident light may be incident on the low-efficiency areas of the PMT. This affected overall output of the PMT.

Therefore, new systems and techniques are needed.

BRIEF SUMMARY OF THE DISCLOSURE

A system is provided in a first embodiment. The system includes a metal-channel photomultiplier tube. A cathode of the metal-channel photomultiplier tube has high-efficiency areas and low-efficiency areas. An optical system is positioned in a path of a beam of light directed at the metal-channel photomultiplier tube. The optical system is configured to direct most of the beam of light at the high-efficiency areas of the metal-channel photomultiplier tube.

The system can include a light source that generates the beam of light. The optical system is disposed in the path of the beam of light between the light source and the metal-channel photomultiplier tube.

The optical system can be a micro-lens array that includes a plurality of cylindrical lens elements. The optical system also can be a light guide.

The metal-channel photomultiplier tube can include a dynode structure. The high-efficiency areas of the cathode can correspond to positions between the dynode structure.

The high-efficiency areas can be from 35% to 65% of a total area of the metal-channel photomultiplier tube or from 15% to 35% of a total area of the metal-channel photomultiplier tube. These areas can refer to an area of the photocathode exposed to the directed beams of light.

A method is provided in a second embodiment. The method includes generating a beam of light. The beam of light is directed toward an optical system. The beam of light is directed onto a plurality of areas of a metal-channel photomultiplier tube with the optical system.

The optical system can be a micro-lens array that includes a plurality of cylindrical lens elements. The optical system also can be a light guide.

The metal-channel photomultiplier tube can include a dynode structure. The high-efficiency areas of the cathode can correspond to positions between the dynode structure.

The high-efficiency areas can be from 35% to 65% of a total area of the metal-channel photomultiplier tube or from 15% to 35% of a total area of the metal-channel photomultiplier tube.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein increase the effective quantum efficiency of a metal-channel PMT by using a cylindrical micro-lens array or other components to direct incident light from areas of low efficiency on the cathode to areas of high efficiency on the cathode. The micro-lens array can increase the effective quantum efficiency of the detector by up to approximately 10%. Defect sensitivity during semiconductor inspection can be dependent on the quantum efficiency of a metal-channel PMT. A larger quantum efficiency can result in better defect sensitivity.

A PMT is constructed with a housing that includes a photocathode, several dynodes, and an anode. Incident photons strike the photocathode material, which can be deposited on the inside of the entry window of the housing. Electrons are ejected from the surface of the photocathode using the photoelectric effect. These electrons are directed by the focusing electrode toward the electron multiplier, where electrons are multiplied by the process of secondary emission.

The electron multiplier includes dynodes. A dynode is an electrode in a vacuum tube that serves as an electron multiplier through secondary emission. Each dynode can be held at a more positive potential than the preceding one. Low energy electrons are emitted when an electron strikes the first dynode. These electrons are in turn accelerated toward the second dynode. The geometry of the dynode chain is such that a cascade occurs with an exponentially-increasing number of electrons being produced at each stage. This last stage in the series is an anode. Such an arrangement can amplify the current emitted by the photocathode, such as by a factor of one million.

Figure 1:
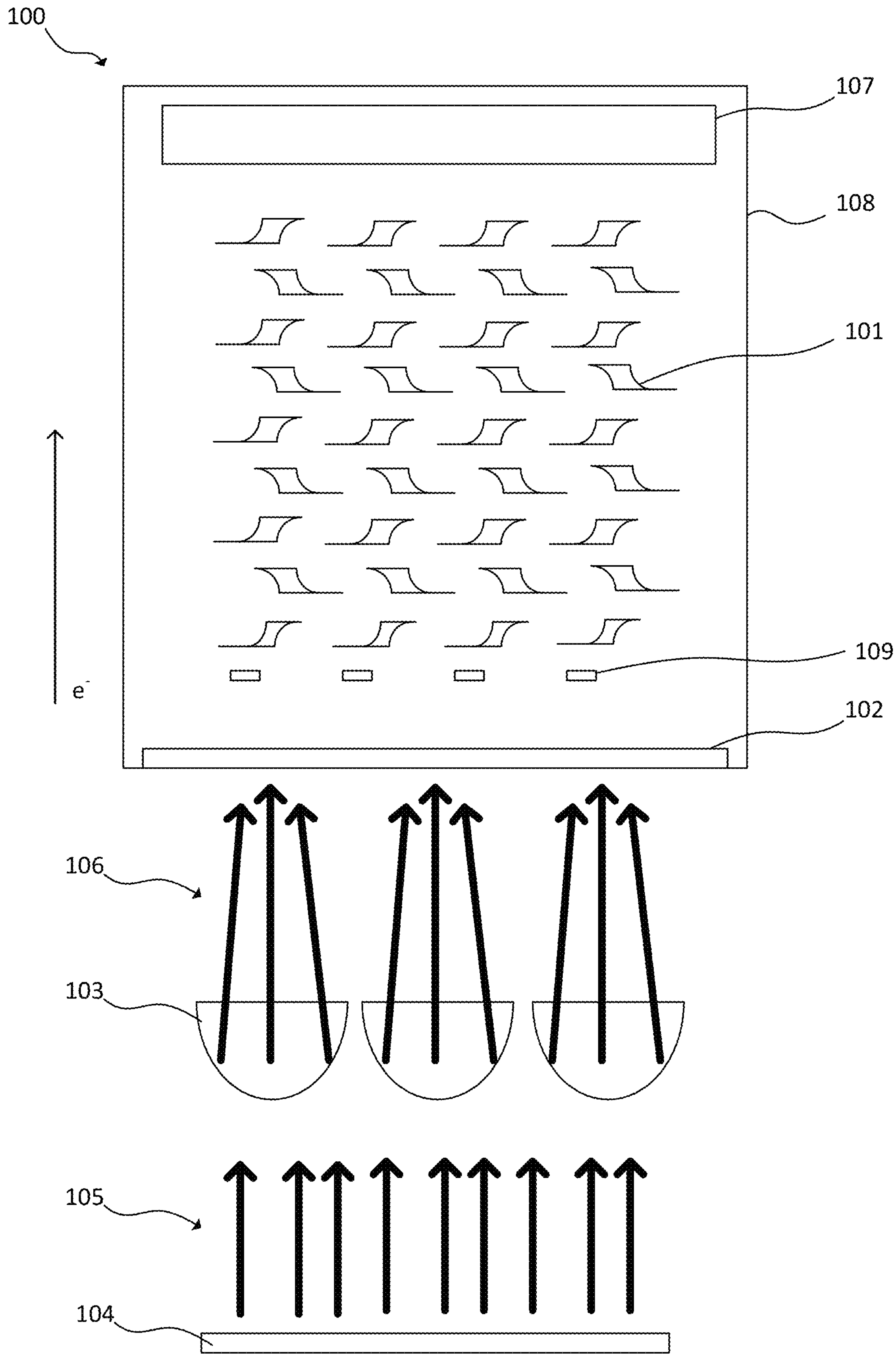
FIG. 1 is an embodiment of a system in accordance with the present disclosure.

FIG. 1 illustrates a system 100 with a metal-channel PMT 108. The metal-channel PMT 108 includes a photocathode 102, field-shaping grid 109, multiple dynodes 101, and an anode 107. All of these components are contained in or otherwise part of an evacuated housing. The photocathode 102, the dynodes 101, and the anode 107 have electrical connections (not shown for simplicity). Each dynode 101 is held at a slightly positive voltage relative to the prior dynode 101 or photocathode 102 for the first dynode 101. The anode 107 is held at a more positive voltage relative to the last dynode 101. A first dynode and last dynode refer to the order in which the electrons impact the dynodes after emission from the photocathode along the electron direction from the photocathode 102 toward the anode 107.

When an incident photon from one of the directed beams of light 106 is absorbed by the photocathode 102, there is a reasonably high probability of one or more electrons being ejected from the photocathode 102. An optional focusing electrode can deflect the electrons so that most of them will strike the first dynode 101. When an electron strikes a dynode 101, it will usually cause multiple (e.g., approximately 10) secondary electrons to be ejected from that dynode 101. Most of the electrons ejected from one dynode 101 strike the next dynode 101. This is repeated multiple times until the amplified signal strikes the anode 107. Thus, the more dynodes 101 in a metal-channel PMT 108, the greater the gain, but the longer the time taken for the metal-channel PMT 108 to respond to a single photon. Because some electrons from one dynode 101 may miss the next dynode 101 and strike another dynode 101 or the anode 107, more dynodes 101 also means a broader electrical pulse in response to a single photon.

Although FIG. 1 illustrates a transmissive photocathode where the photoelectrons are ejected from the opposite side of the photocathode 102 to the incident photons, reflective photocathodes are also known in the art where the photoelectrons are ejected from the same side of the photocathode 102 as the incident photons. The embodiments disclosed herein can apply to a transmissive photocathode or reflective photocathode.

Figure 2:
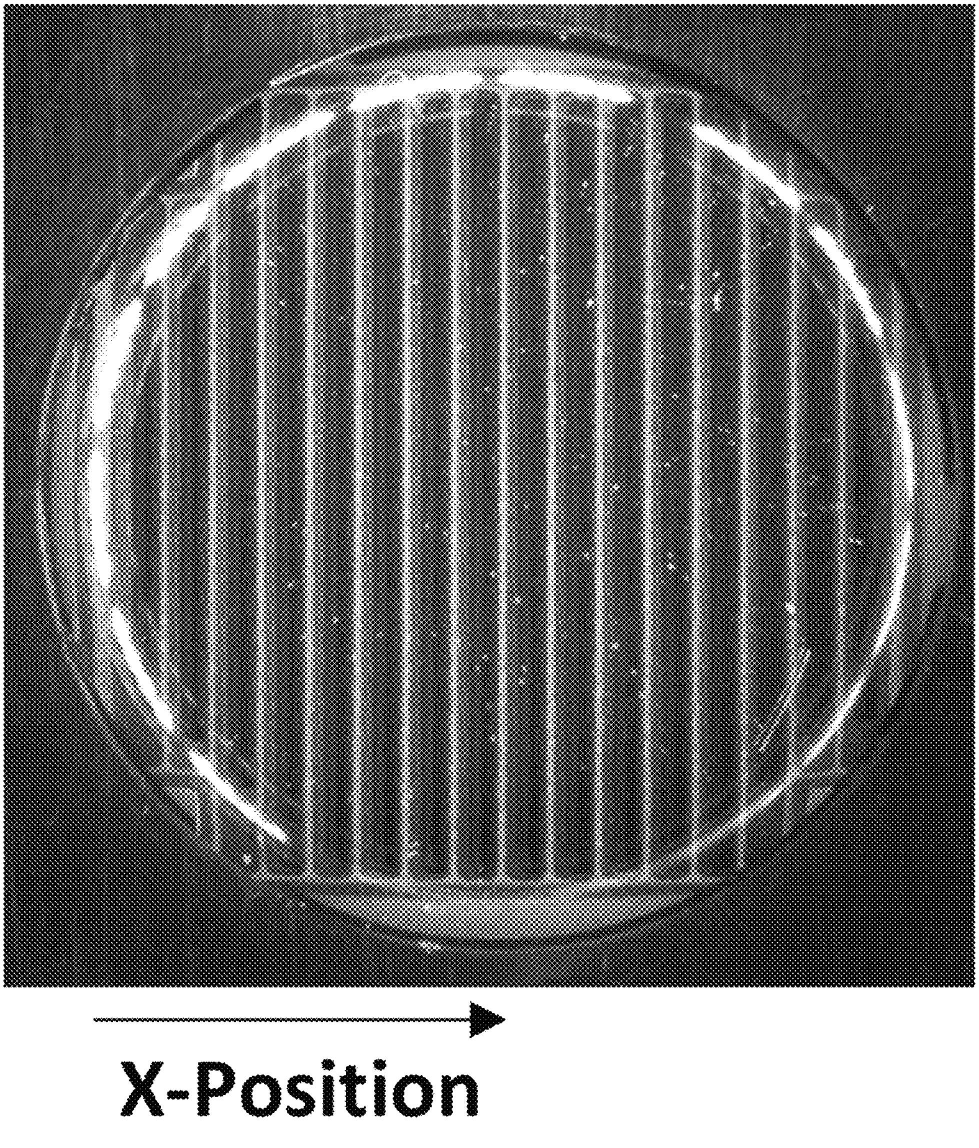
FIG. 2 is shows an exemplary PMT.
Figure 3:
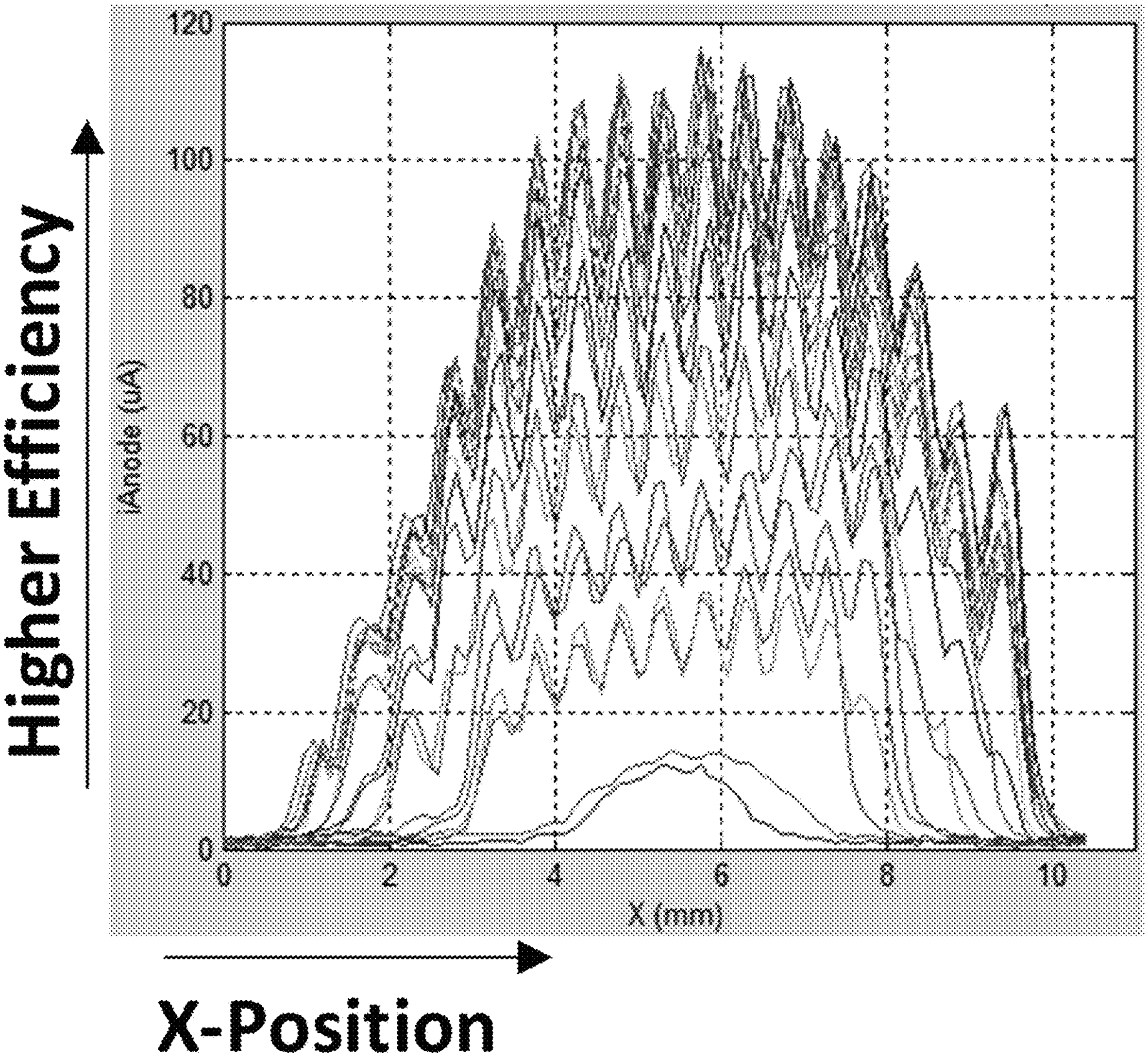
FIG. 3 shows a diagram of efficiency corresponding to X-position across a first exemplary PMT.
Figure 4:
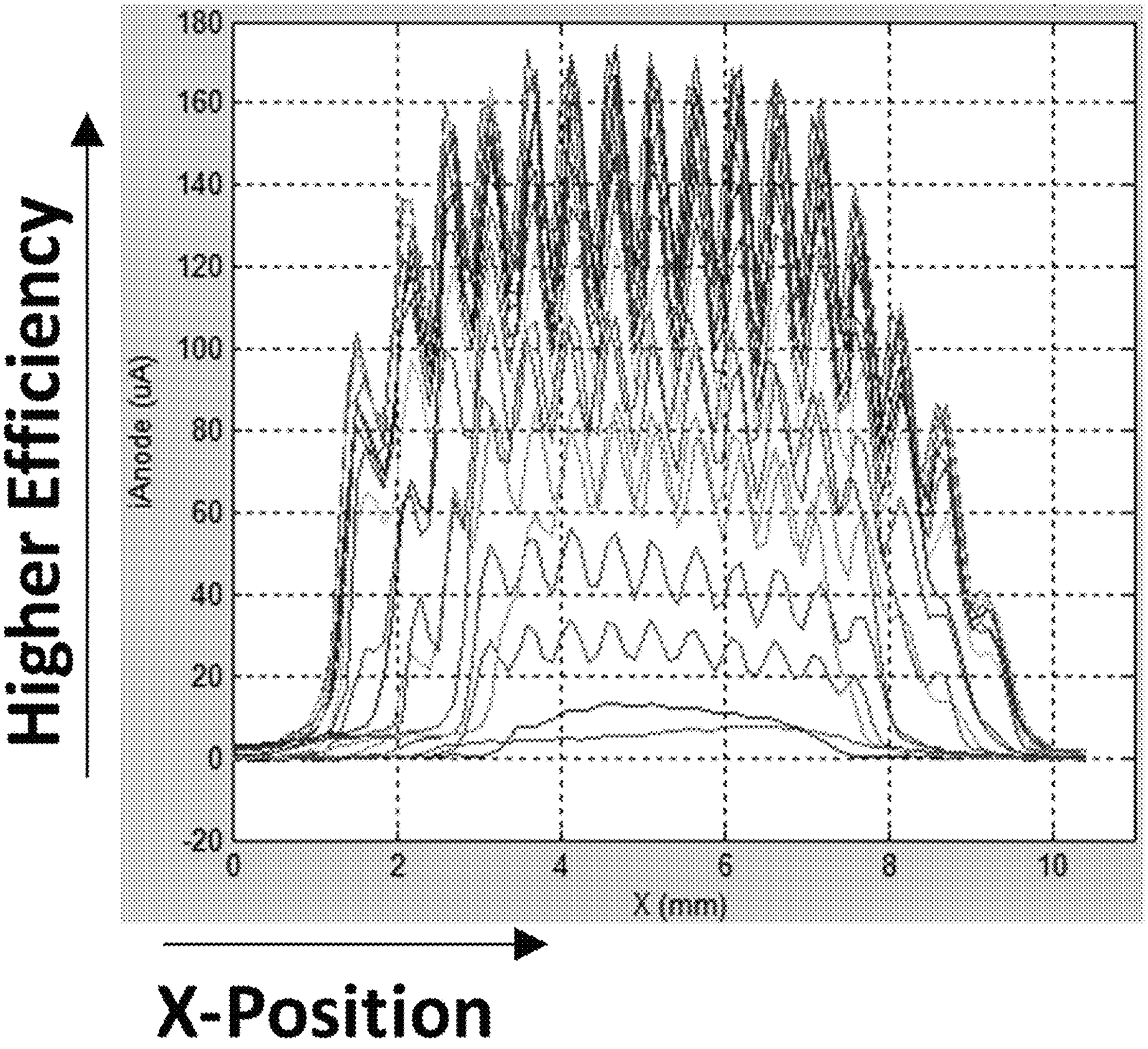
FIG. 4 shows a diagram of efficiency corresponding to X-position across a second exemplary PMT.

The quantum efficiency of a metal-channel PMT 108 varies with a position of the cathode 102, as shown in FIGS. 2-4. There is a periodicity in the X-direction of high and low efficiency areas due to the structure of the metal-channel PMT. The structure can be seen in FIG. 2. The vertical lines seen in FIG. 2 are the field-shaping grid in front of the dynodes. The field-shaping grid can have the same periodicity as the dynodes.

The lines going across the X-direction in FIGS. 3 and 4 show efficiency at different heights are for cross-sections at different positions in the Y-direction, which is perpendicular to the X-direction. The peaks in FIGS. 3 and 4 are areas where the beam of light is directed for improved results. For example, these peaks can correspond to the dynode locations or between the dynode locations depending on the design of the metal-channel PMT. Efficiency drops in FIGS. 3 and 4 at the edges (i.e., near 0 mm and 10 mm along the X-position) because PMT efficiency drops near the edge of the circle.

In an instance, the high-efficiency areas correspond to between the dynode locations and the low-efficiency areas correspond to the dynode locations. In another instance, the high-efficiency areas correspond to the dynode locations and the low-efficiency areas correspond to between the dynode locations. The line-of-sight of the electrons can govern which area corresponds with the high-efficiency areas and the low-efficiency areas.

Turning back to FIG. 1, the metal-channel PMT 108 has a cathode 102 with high-efficiency areas and low-efficiency areas. The optical system 103 is positioned in a path of a beam of light 105 directed at the metal-channel PMT 108. The optical system 103 is configured to direct most of the beam of light 105 at the high-efficiency areas of the metal-channel PMT 108. Thus, the light is biased toward areas of high efficiency, which will increase the effective quantum efficiency of the metal-channel PMT 108. The beam of light 105 is converted into directed beams of light 106. In the embodiment of FIG. 1, the optical system 103 is a micro-lens array with cylindrical lens elements that focuses the directed beam of light 106. Each directed beam of light 106 corresponds to one of the cylindrical lens elements in the optical system 103.

The amount of the beam of light 105 hitting the high efficiency-areas can depend on the degree of collimation in the beam of light 105. If the beam of light 105 is well-collimated, then almost all the light can hit the areas of high sensitivity.

In an example, the high-efficiency areas of the metal channel PMT 108 and the low-efficiency areas of the metal channel PMT 108 are each half of the total area. Increasing the fraction of light on the high-efficiency area will increase the effective quantum efficiency. This result is as if more of the metal channel PMT 108 is at the efficiency of the high-efficiency area.

The high-efficiency areas can represent from 35% to 65% (including all ranges and values to the 0.1% between) of the total area of the metal channel PMT 108, though other percentages are possible depending on the configuration of the metal channel PMT 108. Some metal channel PMT 108 configurations can have lower amounts of high-efficiency areas, such as from 15% to 35% (including all ranges and values to the 0.1% between) of the total area of the metal channel PMT 108. Focusing or otherwise directing the beam of light 105 preferentially to these high-efficiency areas can provide the improved performance of the metal-channel PMT 108. For example, effective quantum efficiency of the detector can be increased by approximately 10%. This is difficult to accomplish by merely redesigning the dynodes, so the increase in quantum efficiency was unexpected.

The system 100 also includes a light source 104 that generates the beam of light 105. The optical system 103 is disposed in the path of the beam of light 105 between the light source 104 and the metal-channel PMT 108. The light source 104 can be a laser or other light sources. For example, visible or ultraviolet wavelengths can be used. A detector can be used to detect the incoming light.

While the optical system 103 is illustrated with three of the cylindrical lens elements, more or fewer cylindrical lens elements can be part of the optical system 103. The lens elements can be etched into a structure surface of glass or can be discrete lens elements.

In an instance, the low-efficiency areas of the cathode 102 correspond to a position of the dynode structure. Thus, the low-efficiency areas of the cathode 102 are where the dynode structure is in the line-of-sight of the electrons in this example. Regardless of the relationship between the low-efficiency areas of the cathode 102 and the position of the dynode structure, the beam of light 105 can be focused or otherwise directed to the high-efficiency areas after these areas are determined for a metal channel PMT 108.

Figure 6:
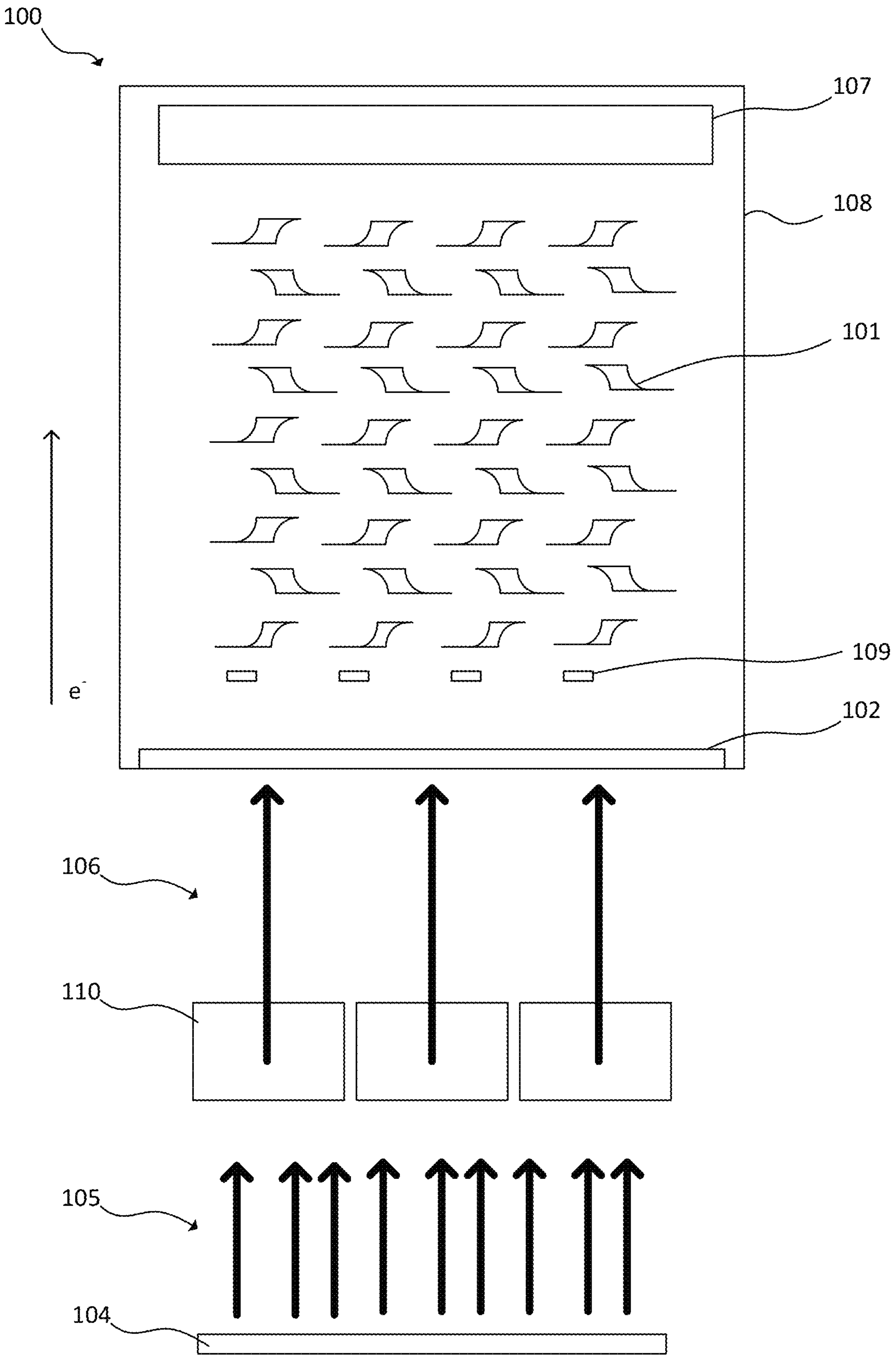
FIG. 6 is a second embodiment of a system in accordance with the present disclosure.

Cylindrical micro lenses are illustrated in FIG. 1, but other optical systems are possible. For example, light guides can be used. A light guide 110 is illustrated in FIG. 6. The light guide (or light pipe) can direct light to the high-efficiency areas.

Figure 5:
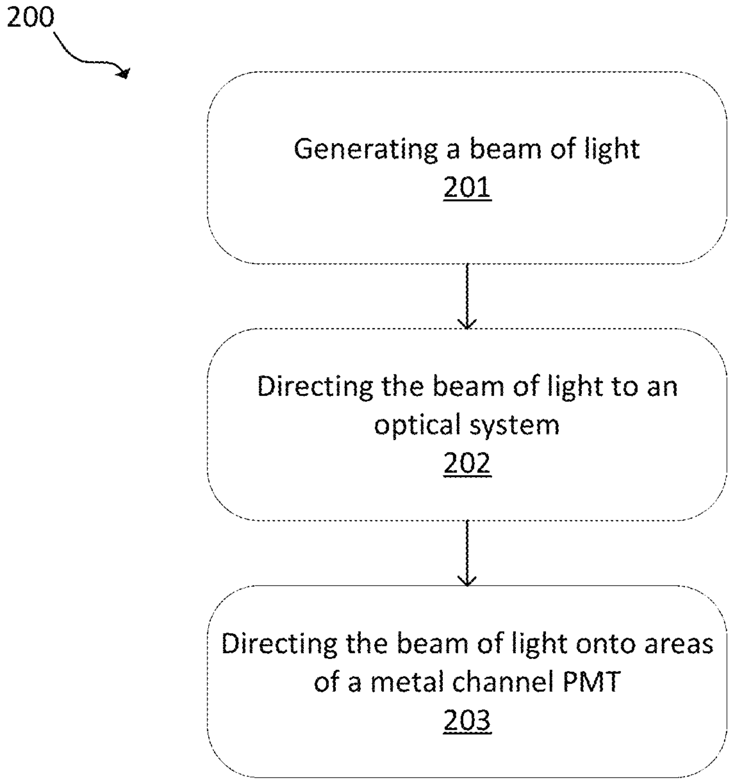
FIG. 5 is an embodiment of a method in accordance with the present disclosure.

FIG. 5 is a flowchart of a method 200, which can use an embodiment of the system 100. A beam of light is generated at 201. The beam of light is then directed toward an optical system (e.g., a micro-lens array or a light guide) at 202 and directed on the metal channel PMT using the optical system at 203. For example, using the micro-lens array, the beam of light is focused onto areas of a metal-channel PMT at 203. The micro-lens array can include cylindrical lens elements or other components. Using the metal-channel PMT, the photons in the beam of light are converted to electrons using a dynode structure in the metal-channel PMT.

The areas receiving the light can correspond to high-efficiency areas of a cathode of the metal-channel photomultiplier tube. The high-efficiency areas of the cathode can correspond to a position between the dynode structure. Corresponding to a position can refer to an alignment in the direction of travel for the beam of light through the metal-channel PMT. Thus, the position of the dynode structure can be in a path of the beam of light that avoids hitting the cathode.

In an instance, the beam of light can be rastered across the areas of the metal-channel PMT.

The amount of light directed on high-efficiency areas of the metal channel PMT can be from 40% to approximately 100% of the total light in the system, including all values to the 0.1% and ranges between. For example, greater than approximately 50% of the beam of light is directed at the high-efficiency areas.

The variation in efficiency across the X-position was surprising. Expectations based on previous studies were that there would be little variation in efficiency across the X-position and that the efficiency chart should be more uniform.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising: a metal-channel photomultiplier tube that includes a photocathode, an anode, and a dynode structure with three or more rows of dynodes that extend from the photocathode to the anode, wherein the photocathode of the metal-channel photomultiplier tube has first areas and second areas, wherein the first areas have a higher efficiency than the second areas, wherein the first areas of the photocathode correspond to positions between the rows of the dynodes in the dynode structure, and wherein the first areas are from 15% to 65% of a total area of the metal-channel photomultiplier tube; and an optical system positioned in a path of a beam of light directed at the metal-channel photomultiplier tube, wherein the optical system is a micro-lens array that includes a plurality of cylindrical lens elements, and the optical system is configured to direct most of the beam of light at the first areas of the metal-channel photomultiplier tube.

2. The system of claim 1, further comprising a light source that generates the beam of light, wherein the optical system is disposed in the path of the beam of light between the light source and the metal-channel photomultiplier tube.

3. The system of claim 1, wherein the first areas are from 35% to 65% of a total area of the metal-channel photomultiplier tube.

4. The system of claim 1, wherein the first areas are from 15% to 35% of a total area of the metal-channel photomultiplier tube.

5. A method comprising: generating a beam of light; directing the beam of light toward an optical system, wherein the optical system is a micro-lens array that includes a plurality of cylindrical lens elements; and directing most of the beam of light onto a plurality of areas of a metal-channel photomultiplier tube with the optical system, wherein the metal-channel photomultiplier tube includes a photocathode, an anode and a dynode structure with three or more rows of dynodes that extend from the photocathode to the anode, wherein the areas have a higher efficiency compared to other areas of the photocathode of the metal-channel photomultiplier tube, wherein the areas of the photocathode correspond to positions between the rows of the dynodes in the dynode structure, and wherein the areas are from 15% to 65% of a total area of the metal-channel photomultiplier tube.

6. The method of claim 5, wherein the areas are from 35% to 65% of a total area of the metal-channel photomultiplier tube.

7. The method of claim 5, wherein the areas are from 15% to 35% of a total area of the metal-channel photomultiplier tube.

* * * * *